United States Patent [19]

Shand et al.

[11] 3,858,048

[45] Dec. 31, 1974

[54] SENSOR-EYE FOR ULTRA-VIOLET WATER STERILIZER

[75] Inventors: William A. Shand; Wolfgang Scherrelies, both of Vancouver, British Columbia, Canada

[73] Assignee: Naturvard Research (Canada) Ltd., British Columbia, Canada

[22] Filed: Aug. 9, 1973

[21] Appl. No.: 387,012

[30] Foreign Application Priority Data
Aug. 23, 1972 Canada .............................. 150080

[52] U.S. Cl. ............................. 250/373, 250/372
[51] Int. Cl. ........................................ G01n 21/24
[58] Field of Search .......... 250/343, 344, 372, 373; 350/312; 313/111, 110

[56] References Cited
UNITED STATES PATENTS

| | | | |
|---|---|---|---|
| 2,974,226 | 3/1961 | Fisher | 350/312 |
| 3,566,105 | 2/1971 | Wiltrout et al. | 250/373 |
| 3,614,452 | 10/1971 | Felton | 250/576 |
| 3,723,731 | 3/1973 | Blau | 250/343 |

Primary Examiner—Archie R. Borchelt
Assistant Examiner—B. C. Anderson
Attorney, Agent, or Firm—Finnegan, Henderson, Farabow & Garrett

[57] ABSTRACT

Disclosed is a novel construction of a sensor-eye satisfactory for application monitoring of ultra-violet radiation intensity and particularly useful in fluid sterilizers such as water sterilizers.

6 Claims, 4 Drawing Figures

PATENTED DEC 31 1974

3,858,048

SENSOR-EYE FOR ULTRA-VIOLET WATER STERILIZER

This invention relates to a sensing eye especially suited for ultra-violet radiation monitors.

A specific frequency range of ultra-violet radiation has been used to kill bacteria and the same is known as the "bacteriastat" frequency. Any fluid, such as water, when exposed to the bacteriastat frequency, for a sufficient period of time, becomes bacteria free or sterilized, provided the flux of the radiation is of sufficient intensity. This principal, known for many years, has recently been used in water sterilizers. Experience has shown, however, that care must be experienced to maintain the ultra-violet at the bacteriastat frequency in order to ensure adequate sterilization, as a small frequency deviation of the ultra-violet from the bacteriastat frequency will inhibit the creation of the bacteria killing radiation.

It has been therefore convenient to provide, an ultra-violet radiation monitor, for water sterilizers, to monitor the intensity or flux of the ultra-violet radiation passing through the fluid and as well, in preferred applications the frequency of the ultra-violet.

Unfortunately, ultra-violet radiation has certain properties which make the construction of such a monitor difficult and expensive. In the first instance ordinary flint glass inhibits ultra-violet radiation and hence silica glass or quartz must be used. Further, while it is convenient to use a photocell to measure radiation intensity or flux, the photocell must be retained physically away from the fluid which is being sterilized by exposure to the ultra-violet radiation, otherwise the photocell is destroyed. As a result, it has been customary to construct a sensing or monitor eye to be disposed between the fluid which is to be monitored for flux transmission intensity of ultra-violet and the actual sensor which converts the ultra-violet radiation to electrical impulses or the like (photocell) for subsequent measuring or monitoring.

The object of the invention is to provide a novel sensing eye construction.

A further object is to provide a sensing eye which is cheap to manufacture and easily assembled during production and which additionally avoids air bubble entrapment, within the monitored fluid, in the vicinity of the sensing-eye due to the profile of the eye at its sensing orifice.

The invention therefore achieves a sensor-eye comprising:
a. a hollow member having two opposite ends each defining a seat with an open base, the member defining a plenum communicating with the bases; the plenum having a central crossectional area larger than the area the respective bases;
b. sealing members mounted in the respective seats;
c. windows mounted in said seats over said sealing members;
d. an ultra-violet transmissive fluid disposed within the plenum between the two windows;
e. means urging the windows against the sealing means and seats to constrain the fluid within the hollow member.

The invention will now be described by way of example with reference to the accompanying drawings in which.

Figure 4:
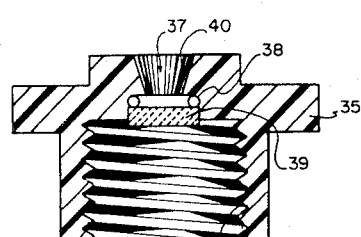
FIG. 4 is a crossectional view of the holder for the device of FIGS. 1 and 3.
Figure 2:
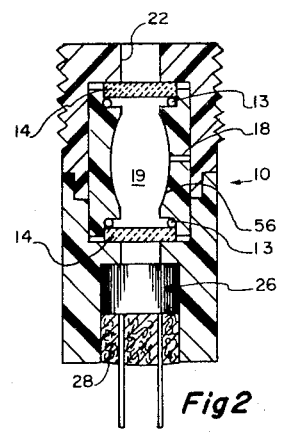
FIG. 2 is an alternative embodiment of the hollow member.
Figure 1:
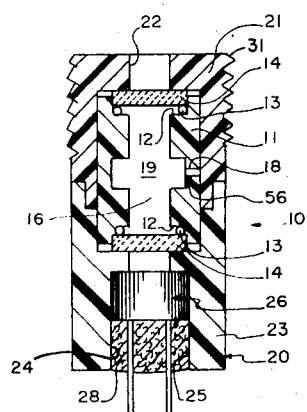
FIG. 1 is a crossection of an embodiment of the invention.
Figure 3:
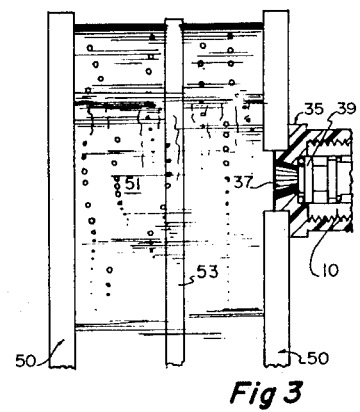
FIG. 3 illustrates the device mounted for use in its monitor position.

Referring to FIG. 1, the device 10 includes a hollow member 11 having opposite ends each defining a circumferential seat 12. Sealing means, such as "O" rings 13 are mounted in each seat and a disc-like piece of used silica glass (quartz glass) is mounted over each ring 13 to act as a window 14. The hollow member 11 defines the plenum 16 having central crossectional area larger than the area at the respective bases of the seat 12, and a small channel 18 is provided which makes communication with the central crossectional area of the plenum whereby the plenum may be filled with a fluid 19 which passes or transmits ultra-violet radiation (an ultra-violet transmissive fluid) for example, nickel-cobalt fluid. The hollow member 11 with seals 13, windows 14, and ultraviolet transmissive fluid 19 is encapsulated in a nesting holder 20 of two parts, a head portion 21 defining an orifice 22 and a base portion 23 defining an orifice 24 and a socket 25 into which is mounted a photocell 26 secured into the socket by an appropriate adhesive 28. The windows, plenum, and orifices 22 and 24 as well as the photocell 26 are arranged in registry so that radiation striking the entrance of the orifice 22 may pass through the system to strike the photocell 26. Terminals 29 of the photocell 26 make connection to an appropriate electronic system (not shown) whereby monitoring of the flux intensity the ultra-violet striking the entrance of the orifice 22 may be made.

The parts 11, 21 and 23 may be made of molded plastic for example, ABS plastic or other suitable material. When they are of molded plastic the nesting holder 20 is held together, that is the head portion 21 is fused to the base portion 22 by an appropriate gluing compound which those familiar in the art will know. Preferably, the upper margin of the head portion 21 is threaded at 31 and a female holder 35 is provided with mating threads 36 and is adapted to accept the nesting holder 20. The female holder has in its base, an orifice 37 with circumscribing seal 38 (O ring) together with fused silica glass window 39. Preferably the orifice has a conical taper 40 at its head. The female holder is mounted into a container 50, adapted to hold a fluid 51 to be sterilized; the fluid 51 being disposed between an ultra-violet radiation source 53 and the orifice 37. Radiation generated by the source 53 passes through the fluid 51 and enters the female holder orifice 37 to pass through the device 10 and strike the photocell 26 whereby the voltage across the terminals thereof is a function of the radiation flux intensity of the radiation passing through the sterilized fluid 51.

Now it is convenient to provide threading means, between the female holder 35 and the nesting holder 20 whereby interchange of the device 10 can readily be accomplished in the working environment of the sterilizer, although any other removable connection would suffice. The hollow member 11 is provided with a plenum of larger central crossection so that air bubbles which might be entrapped in the transmission fluid 19, during assembly, will, when the device 11 is placed in its preferred operational position, horizontally, rise to the top, 56 of the larger central region to be disposed out of the path of the monitored radiation. It has been found that unless the female holder 35 is provided with the orifice 37 having the profile of a conical taper or the like air bubbles can become entrapped in the orifice whereby inconsistent readings of the monitored radiation can occur as a result of radiation passing in part through the air of the air bubble and not completely through the fluid. Extraneous or incorrect readings up to 40 percent variation from the true reading can thus occur.

The embodiments of the invention in which an exclusive property or privilege is claimed are defined as follows:

1. A Sensor-eye comprising: (a) a hollow member having two opposite ends each defining, an orifice with a circumscribing seat about the orifice, said member defining a plenum communicating with the orifices, the plenum having part of the crossectional area larger than the area of the respective orifice; (b) sealing members mounted in the respective seats; (c) windows disposed in the orifices and mounted in said seats over said sealing members; (d) an ultra-violet transmission fluid disposed within the plenum between the two windows; (e) means urging the windows against the sealing means and seats to constrain the fluid within the hollow member.

2. The sensor-eye of claim 1 wherein a channel communicates with the plenum at the central crosssectional area and the channel is sealed closed.

3. The sensor-eye of claim 1 wherein the ultra-violet transmission fluid is a nickel-cobalt fluid.

4. The sensor-eye of claim 1 including an ultra-violet radiation responsive device mounted against one of said windows and in registry with said windows and plenum whereby the radiation is adapted to pass from the opposite window through the plenum and near window into said device.

5. In combination with the sensor-eye of claim 4, a female holder adapted for mounting in a wall of a container housing a moniterable fluid whose radiation transmission properties are to be measured by the sensor-eye, the female holder comprising a body defining an orifice having conical cross section, the orifice adapted to communicate with its larger diameter disposed to said moniterable fluid, a sealing window extending across the smaller diameter of said orifice to thereby seal the same, and means for holding said sensor-eye in registry with said orifice relative to and in juxtaposition with said sealing window whereby radiation transmitted by the moniterable fluid passes through the orifice and sealing window into the sensor-eye.

6. In combination with the sensor-eye of claim 1, a female holder adapted for mounting in a wall of a container housing a moniterable fluid whose radiation transmission properties are to be measured by the sensor-eye, the female holder comprising a body defining an orifice having conical cross section, the orifice adapted to communicate with its larger diameter disposed to said moniterable fluid, a sealing window extending across the smaller diameter of said orifice to thereby seal the same, and means for holding said sensor-eye in registry with said orifice relative to and in juxtaposition with said sealing window whereby radiation transmitted by the moniterable fluid passes through the orifice and sealing window into the sensor-eye.

* * * * *